(12) United States Patent
MacNeille et al.

(10) Patent No.: US 10,339,807 B2
(45) Date of Patent: Jul. 2, 2019

(54) APPARATUS USING SYNC AND BALANCED V2V COMMUNICATION

(71) Applicant: Ford Global Technologies, LLC, Dearborn, MI (US)

(72) Inventors: Perry Robinson MacNeille, Lathrup Village, MI (US); Cynthia M. Neubecker, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/749,709

(22) PCT Filed: Aug. 26, 2015

(86) PCT No.: PCT/US2015/047001
§ 371 (c)(1),
(2) Date: Feb. 1, 2018

(87) PCT Pub. No.: WO2017/034562
PCT Pub. Date: Mar. 2, 2017

(65) Prior Publication Data
US 2018/0225965 A1    Aug. 9, 2018

(51) Int. Cl.
*G08G 1/0967* (2006.01)
*G08G 1/16* (2006.01)
*H04W 4/46* (2018.01)

(52) U.S. Cl.
CPC . *G08G 1/096741* (2013.01); *G08G 1/096716* (2013.01); *G08G 1/096775* (2013.01); *G08G 1/096783* (2013.01); *G08G 1/096791* (2013.01); *G08G 1/162* (2013.01); *G08G 1/164* (2013.01); *H04W 4/46* (2018.02)

(58) Field of Classification Search
CPC ....... G08G 1/096741; G08G 1/096716; G08G 1/096775; G08G 1/096783; G08G 1/096791; G08G 1/162; G08G 1/164
USPC ........................................ 340/907
See application file for complete search history.

(56) References Cited

U.S. PATENT DOCUMENTS

| | | | | |
|---|---|---|---|---|
| 5,633,629 A | * | 5/1997 | Hochstein | G08C 23/04 340/901 |
| 7,983,836 B2 | * | 7/2011 | Breed | G08G 1/161 340/441 |
| 8,050,855 B2 | | 11/2011 | Coy et al. | |
| 8,576,069 B2 | | 11/2013 | Nadeem et al. | |
| 8,773,281 B2 | | 7/2014 | Ghazarian | |

(Continued)

OTHER PUBLICATIONS

International Preliminary Report on Patentability for PCT Application No. PCT/US2015/047001 dated Sep. 15, 2017.

(Continued)

*Primary Examiner* — Jack K Wang
(74) *Attorney, Agent, or Firm* — Frank Lollo; Neal, Gerber & Eisenberg LLP; James P. Muraff

(57) ABSTRACT

A vehicle equipped with a wireless communication interface is configured to communicate with other similarly equipped vehicles within an intersection area. By including the wireless communication equipment to communicate with other vehicles within the intersection area, a traffic optimization tool running on one or more of the vehicles is enabled to direct traffic through the intersection area even in the case where one or more traffic signals are malfunctioning.

20 Claims, 5 Drawing Sheets

(56) References Cited

U.S. PATENT DOCUMENTS

| | | |
|---|---|---|
| 8,972,159 B2 | 3/2015 | Ferreira et al. |
| 2005/0187701 A1* | 8/2005 | Baney .............. G08G 1/096716 |
| | | 701/117 |
| 2009/0174540 A1 | 7/2009 | Smith |
| 2010/0188265 A1 | 7/2010 | Hill et al. |
| 2010/0225762 A1* | 9/2010 | Augst ....................... B60R 1/00 |
| | | 348/148 |
| 2011/0043378 A1* | 2/2011 | Bailey ..................... G08G 1/07 |
| | | 340/917 |
| 2013/0116915 A1 | 5/2013 | Ferreira et al. |
| 2013/0253816 A1 | 9/2013 | Caminiti et al. |
| 2013/0325241 A1 | 12/2013 | Lombrozo et al. |
| 2015/0213713 A1 | 7/2015 | Taylor |
| 2016/0155334 A1 | 6/2016 | Jansson et al. |
| 2017/0124863 A1* | 5/2017 | Dumazert ............ G08G 1/0112 |

OTHER PUBLICATIONS

International Search Report and the Written Opinion for PCT Application No. PCT/US2015/047001 dated Nov. 23, 2015.

\* cited by examiner

500 ⟶

Resources

|    | NR | NS | NL | WR | WS | WL | SR | SS | SL | ER | ES | EL |
|----|----|----|----|----|----|----|----|----|----|----|----|----|
| NR | X  |    |    |    |    |    |    |    | X  |    | X  |    |
| NS |    | X  |    | X  | X  | X  |    |    | X  |    | X  |    |
| NL |    |    | X  |    | X  | X  | X  | X  | X  |    | X  | X  |
| WR |    | X  | X  | X  |    |    |    |    |    |    |    | X  |
| WS |    | X  | X  |    | X  |    | X  | X  | X  |    |    |    |
| WL |    | X  | X  |    |    | X  |    | X  | X  | X  | X  | X  |
| SR |    |    | X  |    | X  |    | X  |    |    |    |    |    |
| SS |    |    |    |    | X  | X  |    | X  |    | X  | X  | X  |
| SL | X  | X  | X  | X  |    | X  |    |    | X  |    | X  | X  |
| ER |    |    |    |    |    |    |    | X  |    | X  |    | X  |
| ES | X  | X  | X  |    |    | X  |    |    | X  |    | X  |    |
| EL |    |    |    | X  | X  | X  |    | X  | X  |    |    | X  |

Maneuver (row label)

FIG. 5

APPARATUS USING SYNC AND BALANCED V2V COMMUNICATION

CROSS-REFERENCE TO RELATED APPLICATIONS

This is the National Stage of International Application No. PCT/US2015/047001, filed on Aug. 26, 2015 and titled "Apparatus Using SYNC and Balanced V2V Communication," which is incorporated by reference in its entirety.

BACKGROUND

Traffic signals serve to automatically direct vehicles traffic through intersections. However, when traffic signals malfunction, drivers are left alone to navigate through intersections without any guidance and without knowing how other drivers will behave as they navigate through the intersection. Traffic signals may malfunction due to power outages or equipment failure.

While drivers are typically taught to treat such intersections with malfunctioning traffic signals as a four-way stop, this may not always be the most efficient way to direct traffic. However, without new protocols being taught to drivers and without the capability of the vehicles to communicate with each other at traffic intersections, no other viable process has been introduced for directing traffic at an intersection with a malfunctioning traffic signal.

It follows that this disclosure generally relates to a new and unique solution for increasing the efficiency of directing traffic at an intersection where the corresponding traffic signal(s) are malfunctioning.

SUMMARY

The vehicle components, and more specifically the traffic optimization tool, described herein are specially configured to provide a technical solution for implementing a traffic flow optimization by utilizing the ability of vehicles to communicate with each other even when traffic signals are malfunctioning within an intersection area.

Exemplary embodiments provide a vehicle comprising a wireless interface configured to communicate with an offsite wireless interface, and a controller. The controller may be configured to communicate with the wireless interface to transmit information to the offsite wireless interface, and receive information from the offsite wireless interface. The controller may further be configured to determine an operational status for a traffic signal within an intersection area, in response to determining the traffic signal is malfunctioning, generate a traffic optimization plan, and control a communication of the traffic optimization plan.

Exemplary embodiments also provide a method for optimizing traffic flow at an intersection. The method may comprise receiving vehicle location information for a vehicle, determining the vehicle is located in one of a plurality of intersection zones, determining a status of a traffic signal at the intersection, in response to determining the traffic signal is malfunctioning, generating a traffic optimization plan based on the vehicle location information; and controlling a communication of the traffic optimization plan.

This application is defined by the appended claims. The description summarizes aspects of embodiments of the disclosure and should not be used to limit the claims. Other implementations are contemplated in accordance with the techniques described herein, as will be apparent upon examination of the following drawings and description, and such implementations are intended to be within the scope of this disclosure.

BRIEF DESCRIPTION OF THE DRAWINGS

For a better understanding, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

FIG. 5 illustrates an optimization chart that maps desired vehicle maneuvers against corresponding resources that are required to allow for the desired vehicle maneuvers, according to some embodiments.

DETAILED DESCRIPTION

Figure 1:
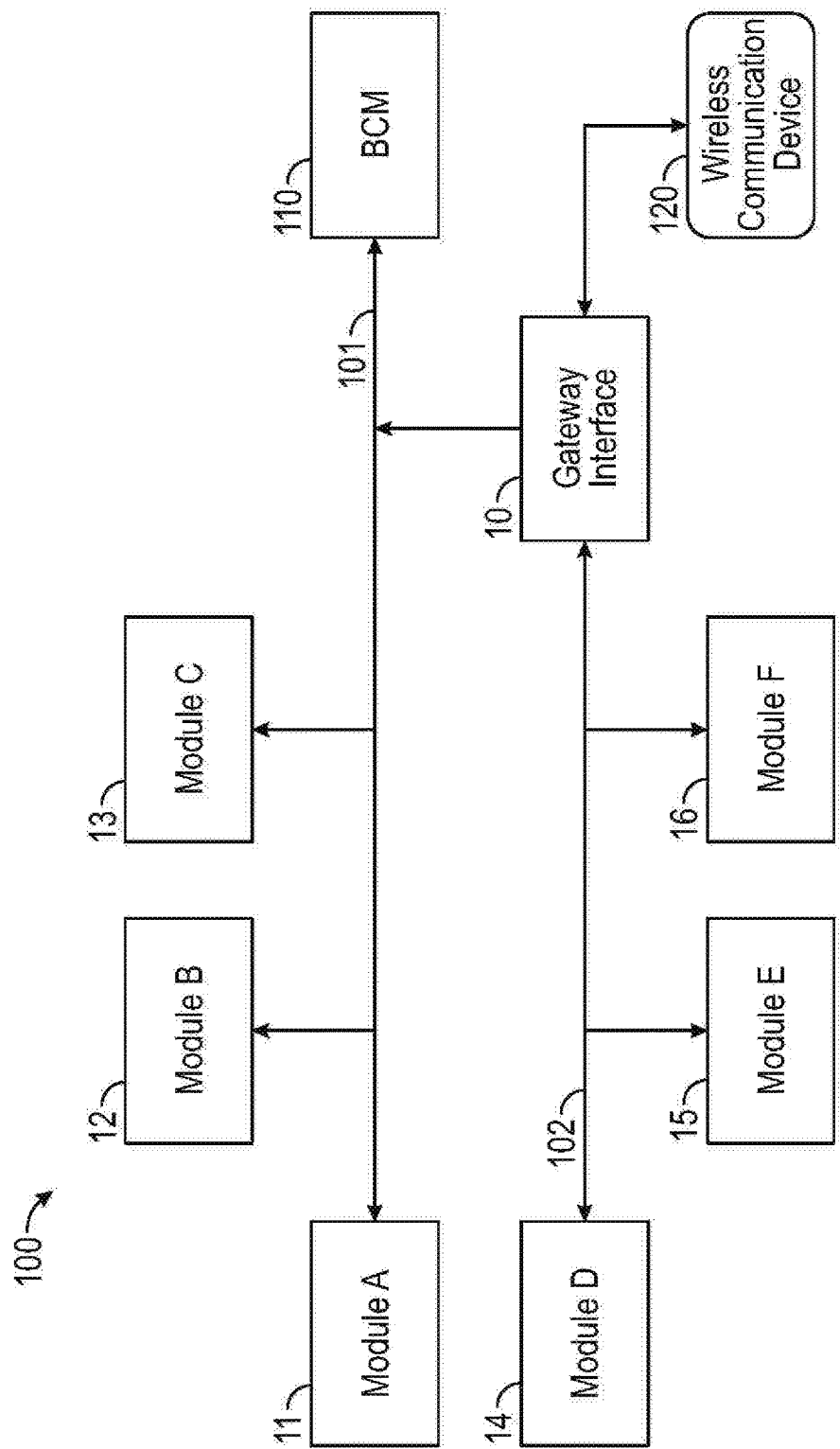
FIG. 1 illustrates an exemplary block diagram of a vehicle system including a wireless communication device.

There are shown in the drawings, and will hereinafter be described, some exemplary and non-limiting embodiments, with the understanding that the present disclosure is to be considered an exemplification and is not intended to limit the features described herein to the specific embodiments illustrated. Not all of the components described in this disclosure may be required, however, and some implementations may include additional, different, or fewer components from those expressly described in this disclosure. Variations in the arrangement and type of the components may be made without departing from the spirit or scope of the claims as set forth herein.

Whereas drivers have been taught to treat intersections having a malfunctioning traffic signal as a four-way stop sign intersection, doing so may be inefficient and cause unnecessary traffic congestion. It follows that this disclosure describes a vehicle system, device, tool, and/or method for optimizing the organization of vehicle travel flow through an intersection when a traffic signal at the intersection is malfunctioning. In addition to situations where a traffic signal is malfunctioning, the intersection optimization described herein may also be applied to intersections located in rural areas with, or without, traffic signals.

The intersection optimization described herein is made possible by technology that allows vehicles to communicate with each other at an intersection. For example, the system, device, and method for optimizing intersection traffic flow described herein involves two or more vehicles located at the intersection to be equipped with wireless communication equipment for communicating with other vehicles at the intersection. A vehicle equipped with a wireless communication interface may be configured to communicate with other vehicles within an area that are also equipped with a wireless communication interface. Such vehicles may communicate wirelessly according to a known communication protocol such as, for example, the Dedicated Short Range Communication (DSRC) protocol implemented under known standards such as IEEE 802.11p, IEEE 1609, and/or SAE J2735. The DSRC protocol operates over a dedicated 75 MHz spectrum band around 5.9 GHz, allocated by the United States Federal Communications Commission (FCC). The DSRC protocol may operate over a different dedicated band in other countries. For example, the DSRC protocol in Japan is configured to operate in the 900 MHz spectrum band in Japan.

The following disclosure assumes vehicles are communicating under the DSRC protocol. However, it is understood that the vehicles include the wireless communication components to be capable of communicating under other known communication protocols.

Communicating under the DSRC protocol allows for communication between vehicles (e.g., Vehicle to Vehicle "V2V" communication) and also allows for vehicle to communicate with infrastructure (e.g., vehicle to infrastructure "V2I" communication). It follows that the connected vehicle described herein is configured to utilize wireless communication to detect noteworthy situations (e.g., traffic signal outage) so that the connected vehicle can initiate, or participate, in the optimized intersection traffic flow described herein with other connected vehicles.

The exemplary vehicle described herein is a passenger vehicle equipped with a specialized computing device capable of implementing the features described herein. For example, the specialized computing device may be a body control module (BCM) equipped in the vehicle to communicate with a plurality of vehicle modules within a controller network (e.g. controller area network (CAN)). In particular, the BCM may be configured to communicate with a wireless communication interface included in the same controller network to implement the optimized intersection traffic flow described herein.

FIG. 1 illustrates an exemplary vehicle controller network 100. Vehicle controller network 100 includes gateway interface 10, body control module (BCM) 110, module A 11, module B 12, module C 13, module D 14, module E 15, and module F 16. The components that comprise vehicle controller network 100 illustrated in FIG. 1 may be connected through a first controller network bus 101 and a second controller network bus 102. BCM 110 may be a computing device such as an electronic control unit configured to control one or more vehicle systems represented by the various vehicle modules illustrated in FIG. 1. The BCM 110 may further include, or be configured to communicate with, a memory unit such as a main memory and/or a static memory for storing digital information described herein. The memory unit can include a solid-state memory such as a memory card or other package that houses one or more non-volatile read-only memories, such as flash memory. Further, the medium unit can be a random access memory or other volatile re-writable memory. Additionally, the medium unit can include a magneto-optical or optical medium, such as a disk or tapes or other storage device to capture information communicated over a transmission medium.

Gateway interface 10 is in communication with module D 14, module E 15, and module F 16 via the second controller network bus 102. Gateway interface 10 may include an on-board diagnostic connector interface configured to receive a connection with wireless communication device 120. The diagnostic connector interface on gateway interface 10 may be in accordance to the OBD II standard, or other known vehicle diagnostic connection standards. Wireless communication device 120 may include a network interface such as a modem for enabling wireless, or wired, communication with another device according to the DRSC protocol, or other communication protocol such as LTE, WiFi, Bluetooth, WiGig, GPS, GNSS, NFC, or other telecommunication protocol. Wireless communication device 120 may further include its own computer comprised of a dedicated processor, memory, and other components for controlling the wireless communication device 120 as well as implementing a tamper proof security feature for preventing unauthorized access to the wireless communication device 120.

Gateway interface 10 is further in communication with module A, module B, module C, and BCM 110 via a first controller network bus 101. Each of the exemplary vehicle modules illustrated in FIG. 1 may represent a combination of one or more of software, hardware, and/or firmware corresponding to vehicle systems such as a power window system, a navigation system, an entertainment system, a temperature control system, a power locking system, a power seat system, a vehicle speed control system, and other vehicle systems found on the vehicle. Each of the exemplary vehicle modules may include sensors for sensing information related to their respective vehicle system (e.g., state information identifying a current state of a component within the respective vehicle system). For example, the power window system may include a window sensor for sensing window position state information, the navigation system may include location sensors for identifying a current vehicle position information, the entertainment system may include various sensors for identifying state information for components within the entertainment system (e.g., volume sensors for identifying current volume information, entertainment output information for identifying the current source of entertainment being output by the entertainment system), the temperature control system may include temperature sensors for sensing the current temperature within the vehicle cabin and/or external temperature, the power locking system may include lock sensors for sensing door lock state information, the power seat system may include seat position sensors for sensing seat position state information, and the vehicle speed control system may include a speed sensor for obtaining the current traveling speed of the vehicle.

In particular, the exemplary vehicle modules illustrated in FIG. 1 may represent a combination of one or more of software, hardware, and/or firmware corresponding to a body control module (BCM), parking assist module (PAM), transmission control module (TCM), performance control module (PCM), antilock brake system (ABS), steering column control module (SCCM), accessory protocol interface module (SYNC) (APIM), restraints control module (RCM), and power steering control module (PSCM). The power steering control module may be configured to control an electric power assist steering (EPAS) system of the vehicle. The PCM may be utilized for controlling propulsion of the vehicle as it crosses through an intersection, the ABS may be utilized for braking the vehicle as it crosses through an intersection, the PCSM may be utilized for steering the vehicle as it crosses through an intersection, in accordance to the intersection traffic flow optimization described herein.

A traffic optimization tool may be included for analyzing a traffic signal malfunctioning status, and implementing the intersection traffic flow optimization described herein. The traffic optimization tool may be a program or application stored within a memory included in vehicle controller network 100 and executed by a processor of the BCM 110. The traffic optimization tool may also be some combination of software and hardware, incorporated on one or more of the components that comprise BCM 110. Alternatively, the traffic optimization tool may be incorporated on one or more components that comprise another vehicle module within vehicle controller network 100. Further description for the traffic optimization tool and the components of vehicle controller network 100 involved in running the access assessment tool is described in more detail below. It should be understood that at least one, and preferably most if not all, vehicles at an intersection are understood to be running the traffic optimization tool described herein. This way, each vehicle running the traffic optimization tool will be able to execute the same traffic optimization strategy to travel through the intersection according to a same optimized traffic flow pattern plan as described in more detail throughout this disclosure. It follows that vehicles running the traffic optimization tool may be able to travel through the intersection without the need for relying on a central control server (e.g., traffic signal, or offsite command server). Even if a vehicle is not running the traffic optimization tool, as long as the vehicle is enabled to receive wireless information, the optimized traffic flow pattern plan that is generated by the traffic optimization tool may be transmitted to and received by the vehicle.

Figure 2:
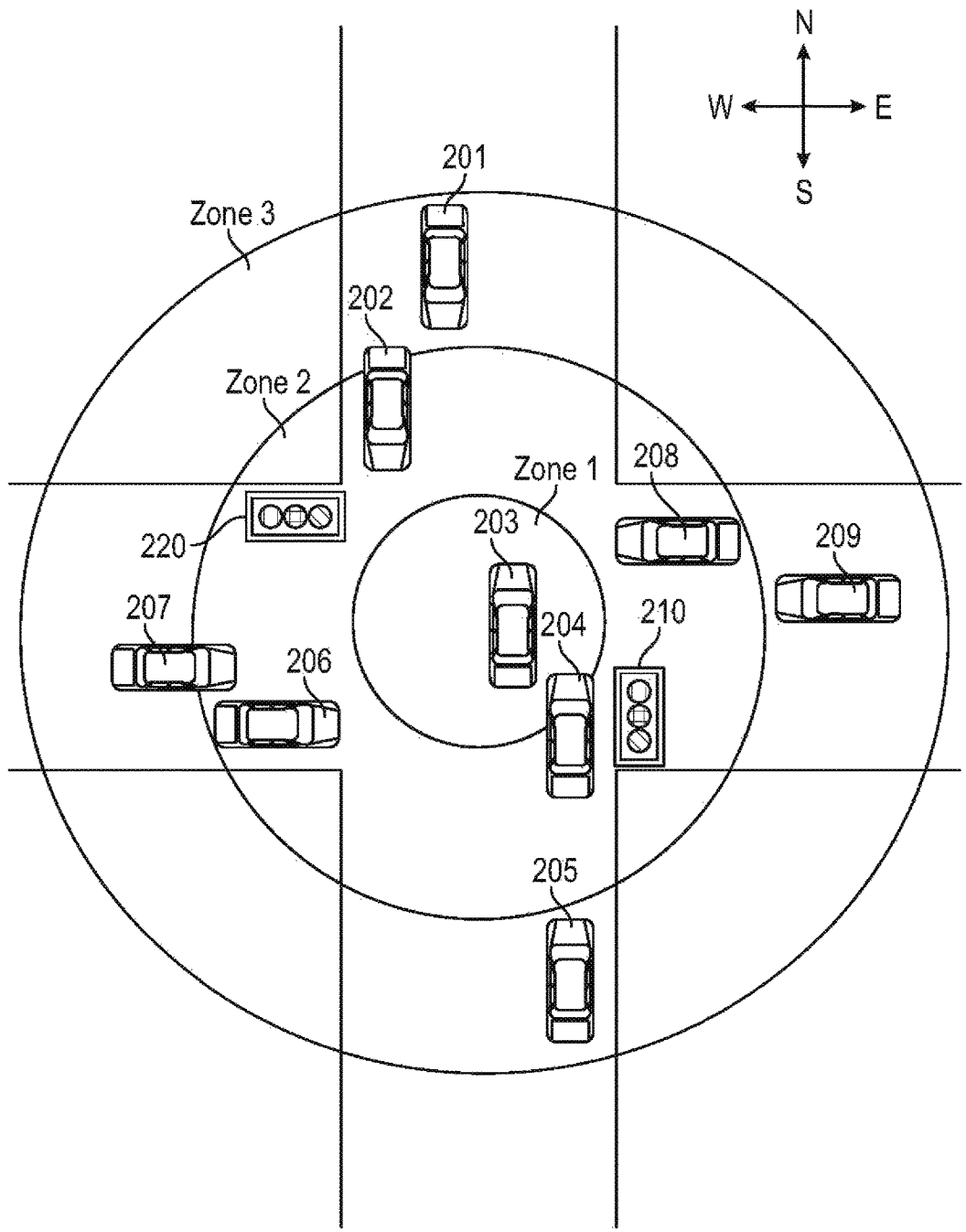
FIG. 2 illustrates an exemplary intersection area including vehicles and traffic signals, according to some embodiments.

FIG. 2 illustrates an exemplary interface area where a first traffic signal 210 (i.e., north-south bound traffic signal) and a second traffic signal 220 (i.e., east-west bound traffic signal) is malfunctioning. FIG. 2 also illustrates a number of vehicles within the intersection area, including south bound vehicles: vehicle 201 and vehicle 202; north bound vehicles: vehicle 203, vehicle 204, and vehicle 205; west bound vehicles: vehicle 206 and vehicle 207; and east bound vehicles: vehicle 208 and vehicle 209.

The intersection area may be divided into three intersection zones: zone 1 (positioned within the intersection), zone 2 (positioned just outside of zone 1), and zone 3 (positioned just outside of zone 2). Zone 1 is configured to substantially, or entirely, define the actual crossing intersection in between the roads that comprise the intersection area. Zone 2 is configured to substantially, or entirely, define the portion of the road where the next vehicle is located for crossing the actual crossing intersection in the intersection area. Zone 3 is configured to define the portions of the intersection area outside of zone 2.

The number of intersection zones is provided for exemplary purposes only, as a fewer or greater number of intersection zones may be included within the intersection area according to other environments. Also, the shape of the intersection zones may be modified in other embodiments. For example, one or more of the intersection zones may be in a rectangular or square shape while one or more of the intersection zones may be in the circular shape illustrated in FIG. 2.

Vehicles within the intersection area may be in wireless communication with each other according to, for example, the DSRC protocol. Vehicles within the intersection may also be in communication with one or more of the first traffic signal 210 or second traffic signal 220. Vehicles within the intersection area may also be in communication with a global positioning satellite (GPS) system or global navigation satellite system (GNSS) for determining the vehicle is within the intersection area, and more specifically, for determining which intersection zone it is currently located in. The vehicle may further utilize additional vehicle positioning information obtain by, for example, a vehicle vision system (e.g., lane assist camera), a LIDAR based radar sensing system, wheel speed counting system, and RCM acceleration signals. The additional vehicle position information obtaining systems may be on-board the vehicle, and may be represented by a module illustrated in FIG. 1. By utilizing the satellite information and/or additional vehicle position information, the vehicle may accurately determine its location and surroundings as it travels through the intersection area according to the intersection traffic flow optimization described herein. The vehicle may also receive and analyze satellite information and/or vehicle position information from other nearby vehicles within the intersection area to better traverse through the intersection area according to the intersection traffic flow optimization described herein.

FIG. 2 illustrates that vehicle 203 is fully located within zone 1, vehicle 206 and vehicle 208 are fully located within zone 2, and vehicle 201, vehicle 205, and vehicle 209 are fully located within zone 3. Vehicles that are partially located between different zones may be grouped into the zone where a greater portion of the vehicle is located within. For example, although vehicle 204 is located between zone 1 and zone 2, vehicle 204 may be grouped into zone 2 because a greater portion of vehicle 204 is located within zone 2. Similarly, although vehicle 202 is located between zone 2 and zone 3, vehicle 202 may be grouped into zone 2 because a greater portion of vehicle 202 is located within zone 2. Similarly, although vehicle 207 is located between zone 2 and zone 3, vehicle 207 may be grouped into zone 3 because a greater portion of vehicle 207 is located within zone 3. According to some embodiments, the traffic optimization tool running on the respective vehicle within the intersection zone may determine its intersection zone location based on receiving location information from a GPS/GNSS system or server. According to some embodiments, the traffic optimization tool running on the respective vehicle within the intersection zone may determine its intersection zone location based on receiving location assignment information from one or more of traffic signal 210 and/or traffic signal 220 that assigns the vehicle to a corresponding intersection zone.

Figure 3:
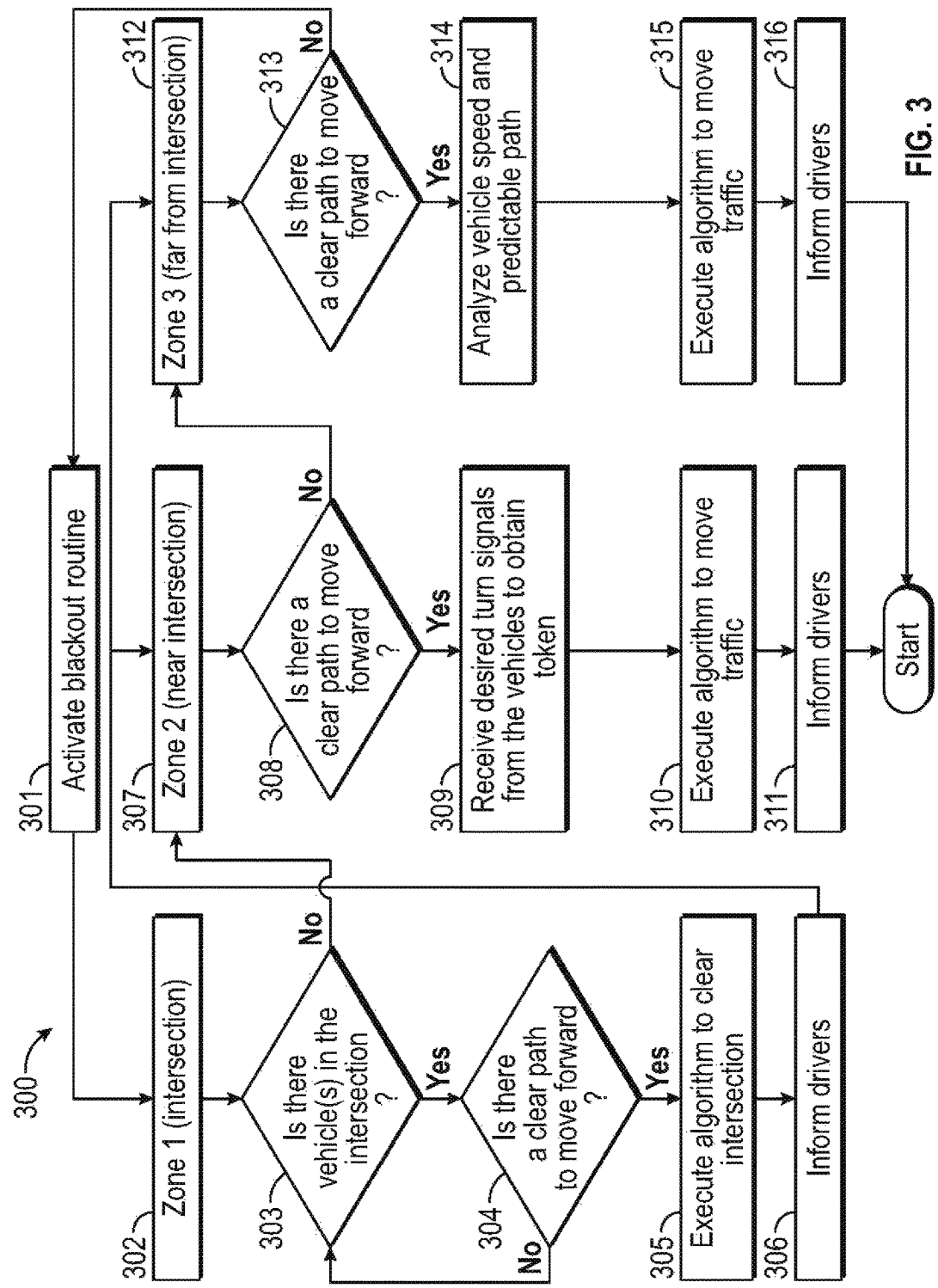
FIG. 3 illustrates a flow chart describing a process implemented by a traffic optimization tool, according to some embodiments.

FIG. 3 illustrates flow chart 300 describing a process for implementing an intersection traffic flow optimization by the traffic optimization tool being executed by, for example, BCM 110 of a vehicle. Flow chart 300 is provided for exemplary purposes within the context of the intersection area illustrated in FIG. 2. According to some embodiments, the traffic optimization tool may implement the intersection traffic flow optimization by communicating with counterpart traffic optimization tool(s) running on one or more vehicles and/or traffic signals located within the intersection area.

At least one vehicle within the intersection area are understood to be equipped with the wireless capabilities to be enabled to communicate with each other within the intersection area according to the DSRC protocol. According to some embodiments, at least one vehicle within the intersection area is understood to be equipped with the wireless capabilities to be enabled to communicate with traffic signal 210 or traffic signal 220 according to the DSRC protocol. According to some embodiments, at least one vehicle within the intersection area is understood to be equipped with the wireless capabilities to be enabled to communicate with an off-site server in order to implement the intersection traffic flow optimization described by the process in flow chart 300.

The intersection traffic flow optimization described by flow chart 300 is implemented after determining that one or more of traffic signal 210 and traffic signal 220 are malfunctioning, at least to some capacity. For instance, the traffic optimization tool running on the BCM 110 may determine one or more of traffic signal 210 and/or traffic signal 220 located within the intersection area is malfunctioning when it receives, through the wireless communication device 120, a message from another vehicle within the intersection area identifying one or more of traffic signal 210 and/or traffic signal 220 is malfunctioning. When the traffic optimization tool determines one or more of traffic signal 210 and/or traffic signal 220 is malfunctioning, the traffic optimization tool may send out a control command to the other vehicles within the intersection area to operate under the black out routine identified in step 301.

In addition or alternatively, the traffic optimization tool may determine one or more of traffic signal 210 and/or traffic signal 220 located within the intersection area is malfunctioning when it transmits a status request signal to one or more of traffic signal 210 and/or traffic signal 220 and does not receive back a positive status report from the one or more of traffic signal 210 and/or traffic signal 220 indicating it is operating properly. When the traffic optimization tool determines one or more of traffic signal 210 and/or traffic signal 220 is malfunctioning, the traffic optimization tool may send out a control command to the other vehicles within the intersection area to operate under the black out routine identified in step 301.

In addition or alternatively, the traffic optimization tool may determine one or more of traffic signal 210 and/or traffic signal 220 located within the intersection area is malfunctioning when it transmits a status request signal to one or more of traffic signal 210 and/or traffic signal 220 and receives back a negative status report from the one or more of traffic signal 210 and/or traffic signal 220 indicating it is malfunctioning in some aspect. The traffic optimization tool may be configured to transmit and receive information (e.g., status request signal and status report) by controlling the wireless communication device 120 to transmit and receive such information. When the traffic optimization tool determines one or more of traffic signal 210 and/or traffic signal 220 is malfunctioning, the traffic optimization tool may send out a control command to the other vehicles within the intersection area to operate under the black out routine identified in step 301.

In addition or alternatively, a passenger within the vehicle may input a status request to the traffic optimization tool requesting a status of one or more of traffic signal 210 and/or traffic signal 220 within the intersection area. The status request may include information indicating the passenger believes one or more of traffic signal 210 and/or traffic signal 220 are malfunctioning. The status request may then prompt the traffic optimization tool to transmit a status query to one or more other vehicles within the intersection area according to the DSRC protocol. Upon receiving the status query, the respective other vehicles may present the query to their passengers prompting them to input their opinion on whether they believe one or more of traffic signal 210 and/or traffic signal 220 are malfunctioning. Each opinion may then be transmitted back to the vehicle for analysis. If a predetermined number (e.g., a majority) of the received opinions indicate they believe one or more of traffic signal 210 and/or traffic signal 220 are malfunctioning, the traffic optimization tool may send out a control command to the other vehicles within the intersection area to operate under the black out routine identified in step 301.

Within the context of the understandings described above, at 301 a black out routine is implemented by the traffic optimization tool running on a vehicle within the intersection area. For instance, the black out routine may be implemented at 301 after the traffic optimization tool determines one or more of traffic signal 210 and/or traffic signal 220 located within the intersection area is malfunctioning.

After activating the blackout routine at 301, at 302 the traffic optimization tool is configured to analyze zone 1 in the intersection area. The analysis of zone 1 includes the determination at 303 of whether there is a vehicle located in the intersection that comprises zone 1.

If the traffic optimization tool determines there is a vehicle within the intersection that comprises zone 1, then at 304 the traffic optimization tool goes on to determine whether there is a clear path for the vehicle to move forward through the intersection. The traffic optimization tool may determine there is a clear path forward for the vehicle in the intersection based on location information (e.g., GPS/GNSS location information) of other vehicles within the intersection area received via communication with the other vehicles. The traffic optimization tool may also determine there is a clear path forward for the vehicle in the intersection based on proximity sensor information (e.g., proximity information sensed by proximity sensors on a vehicle) gathered by the current vehicle running the traffic optimization tool, or received from other vehicles within the intersection area that gathered such proximity sensor information from their own on-board proximity sensors.

If the traffic optimization tool determines there is not a clear path forward for the vehicle in the intersection to move forward, then the traffic optimization tool reverts back to step 303.

If the traffic optimization tool determines there is a clear path forward for the vehicle in the intersection to move forward, then at 305 the traffic optimization tool executes a predetermined optimization algorithm for clearing the intersection and further directing traffic. The optimization algorithm will be described in more detail with respect to an available flow pattern diagram illustrated in FIG. 4 and a resource mapping chart illustrated in FIG. 5. The optimization algorithm will generate an optimized traffic flow pattern plan for the vehicles within the intersection area based on vehicle location information. The optimized traffic flow pattern plan may identify which vehicles within the intersection area are allowed to move through the intersection.

At 306, the optimized traffic flow pattern plan is communicated to one or more vehicles within the intersection area. For example, according to some embodiments the optimized traffic flow pattern plan may be transmitted to all vehicles within the intersection area by the vehicle running the traffic optimization tool that generated the optimized traffic flow pattern plan. According to some embodiments, the optimized traffic flow pattern plan may be transmitted to vehicles within any combination of zone 1, zone 2, and zone 3 by the vehicle running the traffic optimization tool that generated the optimized traffic flow pattern plan.

Upon receipt of the optimized traffic flow pattern plan, the traffic optimization tool running on the vehicle having received the optimized traffic flow pattern plan may present the optimized traffic flow pattern plan to their respective driver. The optimized traffic flow pattern plan may be presented via visual display (e.g., control a vehicle display to display the optimized traffic flow pattern plan) or audio presentation (e.g., control an audio output of the optimized traffic flow pattern plan). The optimized traffic flow pattern plan may identify whether the respective vehicle is allowed to move through the intersection, and if so, in which direction it is allowed to move through the intersection.

After determining there are not vehicles in the intersection at 303 or informing drivers of the optimized traffic flow pattern plan at 306, the traffic optimization tool proceeds to 307 where the traffic optimization tool is configured to analyze zone 2 in the intersection area. The analysis of zone 2 includes the determination at 308 of whether there is a vehicle located in the intersection that comprises zone 2.

If the traffic optimization tool determines there is a vehicle within the intersection that comprises zone 2 but determines there is not a clear path to move forward at 308, then the traffic optimization tool proceeds to step 312 to analyze zone 3. The traffic optimization tool may determine there is a clear path forward for the vehicle in the intersection based on location information (e.g., GPS/GNSS location information) of other vehicles within the intersection area received via communication with the other vehicles. The traffic optimization tool may also determine there is a clear path forward for the vehicle in the intersection based on proximity sensor information (e.g., proximity information sensed by proximity sensors on a vehicle) gathered by the current vehicle running the traffic optimization tool, or received from other vehicles within the intersection area that gathered such proximity sensor information from their own on-board proximity sensors.

However, if the traffic optimization tool determines there is a vehicle within the intersection that comprises zone 2 and determines there is a clear path to move forward at 308, then at 309 the traffic optimization tool may receive turn signal information from one or more vehicles within the intersection area that are set to receive a token according to the optimization algorithm. For example, the traffic optimization tool may receive turn signal information from vehicles within zone 2, where the turn signal information identifies whether a left turn signal or right turn signal is activated on a corresponding vehicle. In addition or alternatively, the traffic optimization tool may receive information identifying whether a vehicle is located in a turn lane (e.g., vehicle lane is a left turn only, right turn only, or straight forward only lane). A vehicle's turn lane location may be identified based on GPS/GNSS location information identifying a location of the vehicle, or based on identification information from the vehicle itself that identifies a current turn lane location for the vehicle which is then transmitted to the traffic optimization tool (i.e., transmitted to the vehicle(s) running the traffic optimization tool).

After receiving the turn signal information, then at 310 the traffic optimization tool executes another iteration of the optimization algorithm to generate an updated optimized traffic flow pattern plan for the vehicles within the intersection area based on additional turn signal information. The optimized traffic flow pattern plan may identify which vehicles within the intersection area are allowed to move through the intersection.

At 311, the optimized traffic flow pattern plan is communicated to one or more vehicles within the intersection area. For example, according to some embodiments the optimized traffic flow pattern plan may be transmitted to all vehicles within the intersection area by the vehicle running the traffic optimization tool that generated the optimized traffic flow pattern plan. According to some embodiments, the optimized traffic flow pattern plan may be transmitted to vehicles within any combination of zone 1, zone 2, and zone 3 by the vehicle running the traffic optimization tool that generated the optimized traffic flow pattern plan.

Upon receipt of the optimized traffic flow pattern plan, the traffic optimization tool running on the vehicle having received the optimized traffic flow pattern plan may present the optimized traffic flow pattern plan to their respective driver. The optimized traffic flow pattern plan may be presented via visual display (e.g., control a vehicle display to display the optimized traffic flow pattern plan) or audio presentation (e.g., control an audio output of the optimized traffic flow pattern plan). The optimized traffic flow pattern plan may identify whether the respective vehicle is allowed to move through the intersection, and if so, in which direction it is allowed to move through the intersection.

After determining there is not a clear path to move forward at 308 or informing drivers of the optimized traffic flow pattern plan at 306, the traffic optimization tool proceeds to 312 where the traffic optimization tool is configured to analyze zone 3 in the intersection area. The analysis of zone 3 includes the determination at 313 of whether there is a vehicle located in the intersection that comprises zone 3.

If the traffic optimization tool determines there is a vehicle within the intersection that comprises zone 3 but determines there is not a clear path to move forward at 313, then the traffic optimization tool proceeds to step 301. The traffic optimization tool may determine there is a clear path forward for the vehicle in the intersection based on location information (e.g., GPS/GNSS location information) of other vehicles within the intersection area received via communication with the other vehicles. The traffic optimization tool may also determine there is a clear path forward for the vehicle in the intersection based on proximity sensor information (e.g., proximity information sensed by proximity sensors on a vehicle) gathered by the current vehicle running the traffic optimization tool, or received from other vehicles within the intersection area that gathered such proximity sensor information from their own on-board proximity sensors.

However, if the traffic optimization tool determines there is a vehicle within the intersection that comprises zone 3 and determines there is a clear path to move forward at 313, then at 314 the traffic optimization tool may receive vehicle speed information at 314 from one or more vehicles within the intersection area. The traffic optimization tool may further analyze the received vehicle speed information to generate a predictable path for the corresponding vehicle based on the received vehicle speed information.

After generating the predictable path, then at 315 the traffic optimization tool executes another iteration of the optimization algorithm to generate an updated optimized traffic flow pattern plan for the vehicles within the intersection area based on additional vehicle speed and predictable path information. The optimized traffic flow pattern plan may identify which vehicles within the intersection area are allowed to move through the intersection.

At 316, the optimized traffic flow pattern plan is communicated to one or more vehicles within the intersection area. For example, according to some embodiments the optimized traffic flow pattern plan may be transmitted to all vehicles within the intersection area by the vehicle running the traffic optimization tool that generated the optimized traffic flow pattern plan. According to some embodiments, the optimized traffic flow pattern plan may be transmitted to vehicles within any combination of zone 1, zone 2, and zone 3 by the vehicle running the traffic optimization tool that generated the optimized traffic flow pattern plan.

Upon receipt of the optimized traffic flow pattern plan, the traffic optimization tool running on the vehicle having received the optimized traffic flow pattern plan may present the optimized traffic flow pattern plan to their respective driver. The optimized traffic flow pattern plan may be presented via visual display (e.g., control a vehicle display to display the optimized traffic flow pattern plan) or audio presentation (e.g., control an audio output of the optimized traffic flow pattern plan). The optimized traffic flow pattern plan may identify whether the respective vehicle is allowed to move through the intersection, and if so, in which direction it is allowed to move through the intersection.

Figure 4:
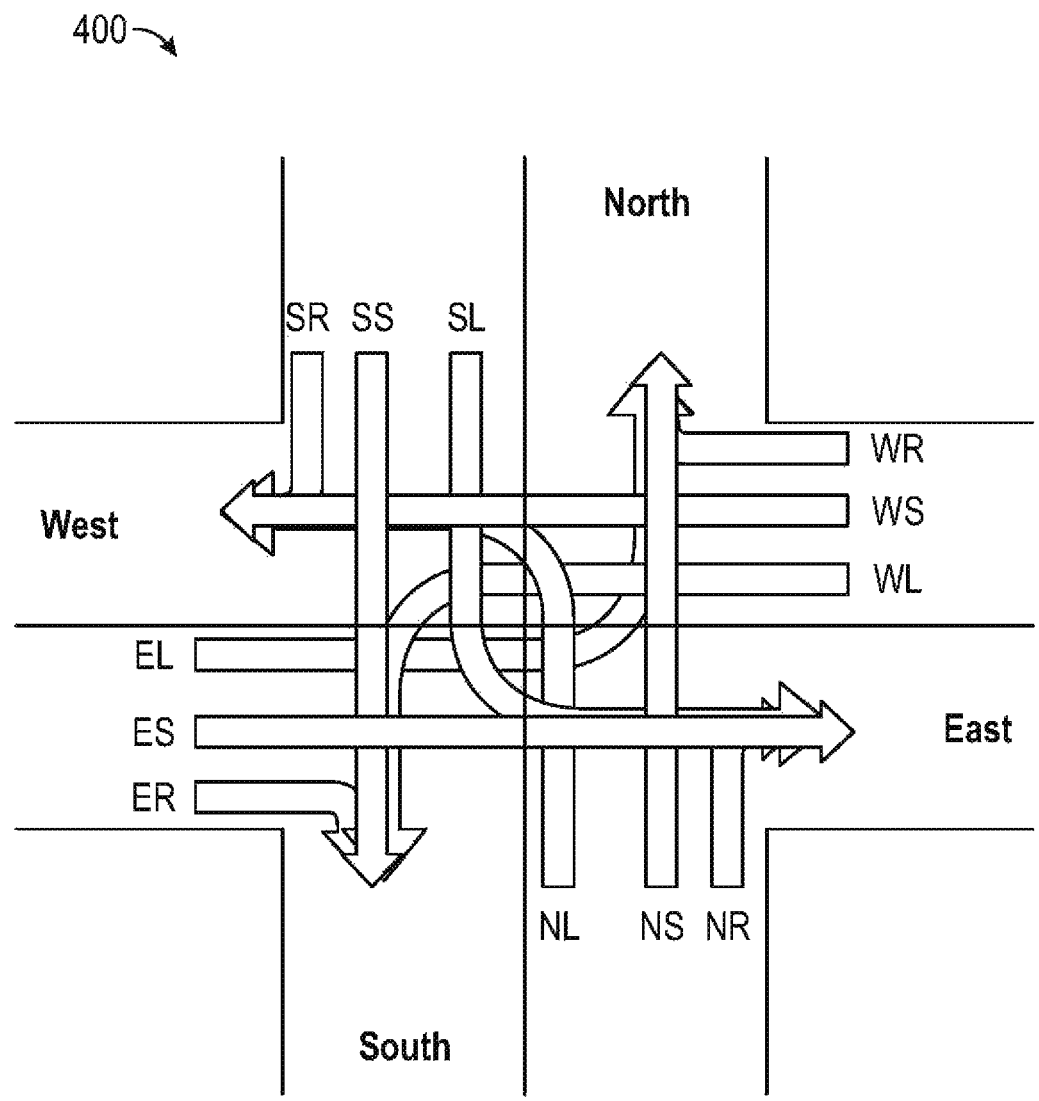
FIG. 4 illustrates an intersection map identifying available traffic flow patterns for vehicles within the exemplary intersection area illustrated in FIG. 2, according to some embodiments.

FIG. 4 illustrates an intersection map 400 that may correspond, for example, the intersection area described herein with respect to FIG. 2. The intersection map 400 identifies available traffic routes for vehicles that arrive at the intersection area.

For example, in the northbound lane the intersection map 400 identifies a northbound left-turn route (NL), a north bound straight route (NS), and a northbound right-turn route (NR). In the southbound lane the intersection map 400 identifies a southbound left-turn route (SL), a southbound straight route (SS), and a southbound right-turn route (SR). In the eastbound lane the intersection map 400 identifies an eastbound left-turn route (EL), an eastbound straight route (ES), and an eastbound right-turn route (ER). In the westbound lane the intersection map 400 identifies a westbound left-turn route (WL), a westbound straight route (WS), and a westbound right-turn route (WR).

FIG. 5 illustrates an optimization chart 500 that may, for example, comprise the optimization algorithm (e.g., Drinking Philosopher algorithm) described herein for determining the optimized traffic flow pattern plan also described herein. The optimization chart 500 plots a vehicle's desired maneuver at the intersection against the vehicle's resources, where the vehicle maneuvers correspond to the available traffic route described in intersection map 400. Each desired maneuver requires a set of resources before the traffic optimization tool allows the maneuver to be made.

For example, if a vehicle is heading west and desires to make a left turn (i.e., WL), then the vehicle will need to obtain specific resources as identified in the optimization chart 500 (e.g., NS, NL, WL, SS, SL, ER, ES, and EL) before the traffic optimization tool will allow the vehicle to make the westbound left-turn route (WL). In this way, the traffic optimization tool may execute the optimization algorithm described herein by referencing the optimization chart 500. It follows that the optimized traffic flow pattern plan generated by the traffic optimization tool may be generated according to the desired maneuvers and required resources described in optimization chart 500.

The vehicle may obtain its resources enabling it to cross through the intersection as follows. When a previous vehicle crosses and leaves the intersection, the previous vehicle will transmit a message to the other vehicles that it is relinquishing its tokens that enabled it to cross the intersection.

As each vehicle within the intersection area is preferably running the same traffic optimization tool (i.e., same optimization algorithm), the traffic optimization tool running on the other vehicles at the intersection is used to determine which vehicle can reserve the paths it needs to pass through the intersection. The optimization algorithm described by optimization chart 500 does this in a way that is fair and avoids deadlock.

None of the vehicles communicating within the intersection area according to the traffic optimization tool is an arbitrator, they are all equal. The optimization algorithm is, however, a balanced algorithm in that it does require trusting the other vehicles at the intersection. This is why enforcement measures are useful. The simplest enforcement measure may be to automate the vehicle's driving function while the vehicle travels through the intersection. For example, the vehicle's propulsion and braking system may work together to control the vehicle's propulsion forward while also controlling the application of the vehicle's brakes to control the vehicle's travel through the intersection. By automating the vehicle's travel through the intersection in accordance to the optimization rule being followed by all the other vehicles at the intersection, the vehicle drivers are prevented from "cheating" and traveling through the intersection out of turn.

In addition or alternatively, instructions identifying when a vehicle is allowed to travel through the intersection in its desired path may be presented to a driver of each vehicle running the traffic optimization tool. For example, the instructions may be displayed on a display device within each of the vehicle cabins, or output on a speaker within each of the vehicle cabins. This allows drivers of the vehicles running the optimization tool to follow the instructions that are displayed, and therefore abide by the optimization algorithm of the optimization tool.

Any process descriptions or blocks in the figures, should be understood as representing modules, segments, or portions of code which include one or more executable instructions, executable by a computing device, processor, or controller (e.g., control unit), for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, are merely set forth for a clear understanding of the principles of this disclosure. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
   a wireless interface to communicate with an offsite wireless interface; and
   a controller to:
      identify a location of the vehicle;
      determine when the location is within one of multiple concentric intersection zones extending outwardly from an intersection area;
      responsive to determining a traffic signal within the intersection area is malfunctioning, generate a traffic optimization plan based on the location being within the one of the zones; and
      communicate the traffic optimization plan.

2. The vehicle of claim 1, wherein the controller is configured to control presentation of the traffic optimization plan by controlling the wireless interface to transmit the traffic optimization plan to the offsite wireless interface.

3. The vehicle of claim 2, further comprising a display, wherein the controller is configured to present the traffic optimization plan via the display.

4. The vehicle of claim 2, further comprising a speaker, wherein the controller is configured to present the traffic optimization plan via the speaker.

5. The vehicle of claim 1, wherein the controller is further configured to:
   receive an offsite vehicle location of an offsite vehicle that includes the offsite wireless interface;
   determine when the offsite vehicle location is in one of the multiple concentric intersection zones; and
   generate the traffic optimization plan based, at least in part, on the offsite vehicle location.

6. The vehicle of claim 1, wherein the vehicle further comprises a turn signal unit;
   wherein the controller is further configured to:
      receive turn signal information from the turn signal unit;
      determine a desired traffic route for the vehicle based on the turn signal information; and
      generate the traffic optimization plan based, at least in part, on the desired traffic route.

7. The vehicle of claim 1, wherein the controller is further configured to:
   receive offsite turn signal information from an offsite vehicle including the offsite wireless interface, the offsite turn signal information corresponding to a desired traffic route of the offsite vehicle; and
   generate the traffic optimization plan based, at least in part, on the desired traffic route of the offsite vehicle.

8. The vehicle of claim 1, wherein the controller is further configured to:
   determine a desired traffic route for the vehicle;
   determine whether a set of required resources corresponding to the desired traffic route are available; and
   generate the traffic optimization plan to indicating the vehicle is allowed to travel in the desired traffic route when the set of required resources corresponding to the desired traffic route are available.

9. The vehicle of claim 1, wherein the multiple concentric intersection zones include a first intersection zone, a second intersection zone, and a third intersection zone, wherein the second intersection zone is inside the third intersection zone and the first intersection zone is inside the second intersection zone and defining the crossing.

10. The vehicle of claim 1, wherein the wireless interface is configured to communicate with the offsite wireless interface according to a dedicated short-range communication protocol.

11. The vehicle of claim 8, wherein the controller is further configured to receive a token, according to an optimization algorithm, for driving through an intersection within the intersection area.

12. The vehicle of claim 11, wherein the controller is to automate driving functions of a propulsion system for driving through the intersection within the intersection area.

13. The vehicle of claim 9, wherein to increase efficiency of traffic through the intersection area, the controller generates the traffic optimization plan for the first intersection zone before the second intersection zone and for the second intersection zone before the third intersection zone.

14. A method for optimizing traffic flow comprising:
   identifying a vehicle location of a vehicle;
   determining when the vehicle location is in one of multiple concentric intersection zones extending outwardly from a crossing of an intersection area;
   determining a status of a traffic signal of the intersection area;
   responsive to determining the traffic signal is malfunctioning, generating a traffic optimization plan based on the vehicle location being in the one of the multiple concentric intersection zones; and
   communicating the traffic optimization plan.

15. The method of claim 14, further comprising:
   receiving an offsite location of an offsite vehicle;
   determining when the offsite location is in one of the multiple concentric intersection zones; and
   generating the traffic optimization plan based, at least in part, on the offsite location.

16. The method of claim 14, further comprising:
   receiving turn signal information from a turn signal unit corresponding to the vehicle;
   determining a desired traffic route for the vehicle based on the turn signal information; and
   generating the traffic optimization plan based, at least in part, on the desired traffic route.

17. The method of claim 14, further comprising:
   receiving offsite turn signal information from an offsite vehicle;
   determining a desired traffic route of the offsite vehicle based on the offsite turn signal information; and
   generating the traffic optimization plan based, at least in part, on the desired traffic route of the offsite vehicle.

18. The method of claim 14, wherein the multiple concentric intersection zones include a first intersection zone, a second intersection zone, and a third intersection zone, wherein the second intersection zone is inside the third intersection zone and the first intersection zone is inside the second intersection zone.

19. The method of claim 16, further comprising receiving a token, according to an optimization algorithm, for driving through an intersection within the intersection area.

20. The method of claim 18, wherein to increase efficiency of traffic through the intersection area, generating the traffic optimization plan includes generating the traffic optimization plan for the first intersection zone before the second intersection zone and for the second intersection zone before the third intersection zone.

* * * * *